US00H002255H

(19) United States
(12) Statutory Invention Registration
Arevalo et al.

(10) Reg. No.: US H2255 H
(43) Published: Jun. 7, 2011

(54) DETERMINATION OF WEAPONS FRATRICIDE PROBABILITY

(75) Inventors: Michelle R. Arevalo, Fredericksburg, VA (US); Geoffrey Bland, King George, VA (US)

(73) Assignee: The United States of America as represented by the Secretary of the Navy, Washington, DC (US)

(21) Appl. No.: 12/152,122

(22) Filed: Apr. 24, 2008

Related U.S. Application Data

(60) Provisional application No. 60/928,671, filed on Apr. 26, 2007.

(51) Int. Cl.
*G06G 7/80* (2006.01)
*F41A 17/08* (2006.01)

(52) U.S. Cl. ..... 235/404; 89/134

(58) Field of Classification Search ..... 235/404; 89/134

See application file for complete search history.

(56) References Cited

U.S. PATENT DOCUMENTS

| | | | | | |
|---|---|---|---|---|---|
| 3,618,456 | A | * | 11/1971 | Mindel | 89/134 |
| 4,164,165 | A | * | 8/1979 | Bean et al. | 89/134 |
| 4,850,260 | A | | 7/1989 | Walker et al. | 89/34 |
| 5,944,281 | A | | 8/1999 | Pittman et al. | 244/3.12 |
| 6,240,294 | B1 | | 5/2001 | Hamilton et al. | 455/456 |
| 7,099,369 | B2 | | 8/2006 | Karlsson | 375/130 |

* cited by examiner

*Primary Examiner*—Dan Pihulic
(74) *Attorney, Agent, or Firm*—Gerhard W. Thielman

(57) ABSTRACT

A method is provided for determining fratricide probability of projectile collision from a projectile launcher on a platform and an interception hazard that can be ejected or launched from a deployment position. The platform can represent a combat vessel, with the projectile launcher being a gun, the interception hazard being a missile, and the deployment position being a vertical launch cell. The projectile launcher operates within an angular area called the firing zone of the platform. The method includes determining the firing zone, calculating an angular firing area, quantifying a frontal area of the interception hazard, translating the resulting frontal area across a flight trajectory, sweeping the projectile launcher to produce a slew angle, combining the slew and trajectory, and dividing the combined interception area by the firing area. The firing and interception areas are calculated using spherical projection.

15 Claims, 13 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

$$\Omega_{RECTANGLE} = \int_{\phi_1}^{\phi_2}\int_{\theta_1}^{\theta_2} \cos\phi \, d\theta \, d\phi$$

$$\Omega_{TRIANGLE} = 2\,\mathrm{ARCTAN}\left(\frac{[\bar{a}\bar{b}\bar{c}]}{abc + (\bar{a}\cdot\bar{b})c + (\bar{a}\cdot\bar{c})b + (\bar{b}\cdot\bar{c})a}\right)$$

DETERMINATION OF WEAPONS FRATRICIDE PROBABILITY

CROSS REFERENCE TO RELATED APPLICATION

Pursuant to 35 U.S.C. §119, the benefit of priority from provisional application 60/928,671, with a filing date of Apr. 26, 2007, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to ordnance fratricide probabilities. In particular, techniques are presented to enable systematic and comparative fratricidal interceptions from concurrently conflicting weapons systems.

Weapon fratricide represents a long-standing safety concern for weapon systems. Fratricide is defined as an attack on friendly forces by other friendly forces. Calculating the probability of fratricide has proven to be technically challenging. Manual resources devoted to these efforts yield limited results due to their time-consuming nature and the simplifying assumptions necessary to render the mathematical calculations tractable on a reasonable scale.

SUMMARY

Conventional fratricide probability techniques yield disadvantages addressed by various exemplary embodiments of the present invention. In particular, conventional systems introduce errors that expand exponentially with increasing field coverage. Additionally, the absence of systematic characterization of the gun-restriction firing zone and ordnance that present interception hazards render manual calculations tedious and time-consuming.

Various exemplary embodiments provide a method for determining fratricide probability of projectile collision from a projectile launcher on a platform and an interception hazard that can be ejected or launched from a deployment position. The platform can represent a combat vessel, with the projectile launcher being a gun, the interception hazard being a missile, and the deployment position being a vertical launch cell. The projectile launcher operates within an angular area called the firing zone of the platform.

The method includes determining the firing zone, calculating an angular firing area, quantifying a frontal area of the interception hazard, translating the resulting frontal area across a flight trajectory, sweeping the projectile launcher to produce a slew angle, combining the slew and trajectory, and dividing the combined interception area by the firing area. The fire and interception areas are calculated using spherical projection.

Various exemplary embodiments calculate the angular firing zone by an integral for a rectangular solid angle as:

$$\Omega_{rectangle} = \int_{\phi_1}^{\phi_2}\int_{\theta_1}^{\theta_2} \cos\phi d\theta d\phi,$$

where $\theta_1$ and $\theta_2$ are azimuth bounds and $\phi_1$ and $\phi_2$ are elevation of the firing zone. Calculating the interception hazard includes discretizing a perspective view of the interception hazard into discrete spatial points, evaluating those points as a contiguous group of triangular plates, and summing all of the triangular solid angles to produce the frontal area.

Triple points can represent each triangular plate to form a triangular solid angle determined by:

$$\Omega_{triangle} = 2\arctan\left(\frac{[\vec{a}\vec{b}\vec{c}]}{abc + (\vec{a}\cdot\vec{b})c + (\vec{a}\cdot\vec{c})b + (\vec{b}\cdot\vec{c})a}\right),$$

where scalar magnitudes a, b, c represent distances and tensors $\vec{a}$, $\vec{b}$, $\vec{c}$ represent vectors between respective points and the projectile launcher, and summing each triangular solid angle to produce the frontal area.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
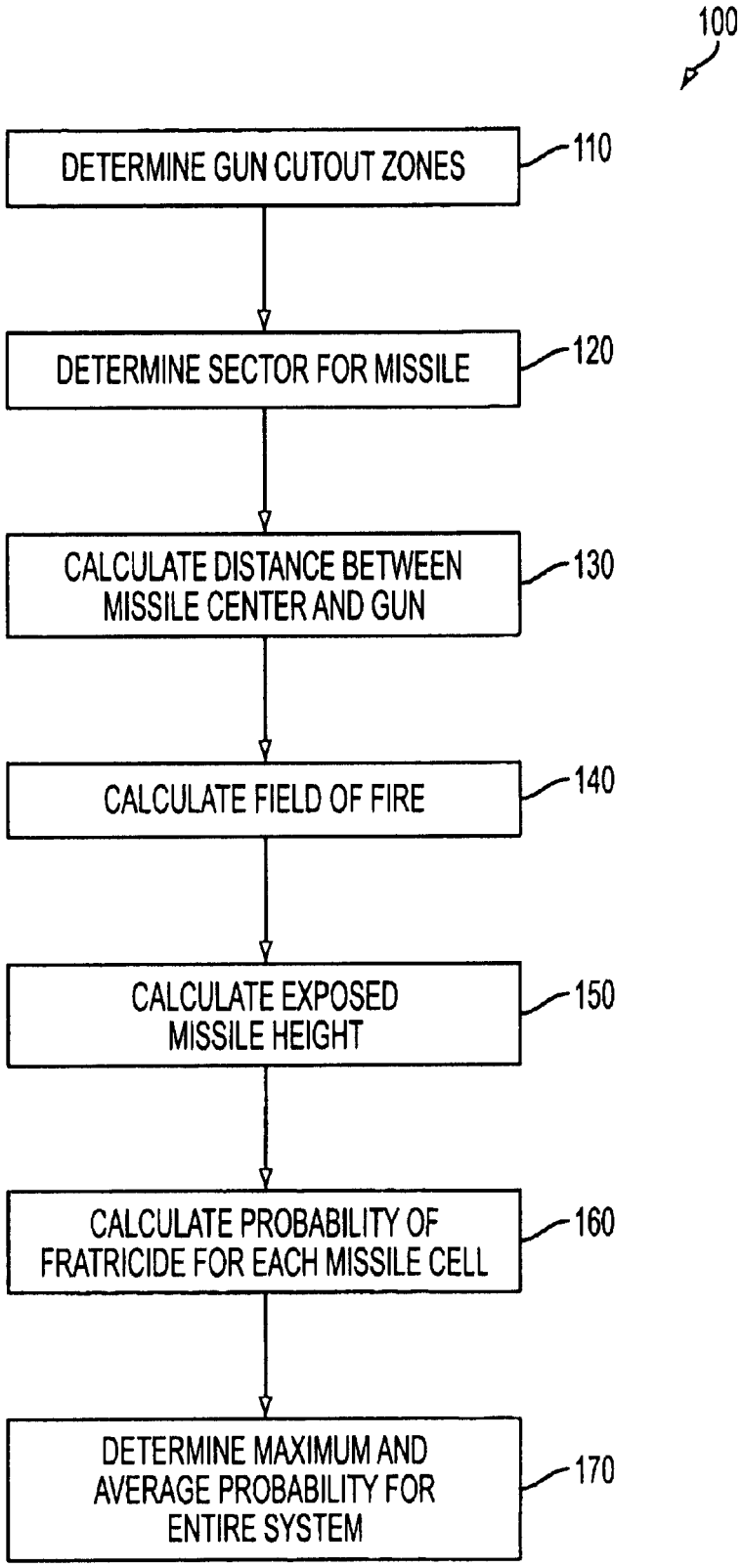
FIG. 1 is a flowchart of a method for Determining Fratricide Probability using cylindrical geometry.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Various exemplary embodiments describe the development of techniques for calculating fratricide probabilities between a gun projectile and other ship-fired ordnance. These embodiments provide flexibility to analyze any combination of ship, layout, gun, and surface-launched ordnance system. Various collected data are mathematically manipulated to calculate the probability of fratricide using solid angle geometry. These calculations account for ordnance fly-out paths as well as gun-slewing action. This development aids and improves accurate prediction of fratricide potential of a weapon system safety engineer between various shipboard weapons systems and to thereby quantify the risk of personnel injury and equipment damage.

In the context of this disclosure, fratricide involves intersection of ordnance on one's own ship (ownship ordnance) with other ownship ordnance. Collision of such ordnance can cause an energetic reaction leading to catastrophic damage and/or death. One such tragic example occurred on Jul. 29, 1967 aboard the U.S.S. Forrestal (CV-59) in which an accidentally launched Zuni rocket struck a bomb-laden A-4 Skyhawk causing a conflagration that cost 134 lives, many of whom from thermal cook-off of exposed munitions. This analysis procedure aids in the determination of the probability of such an incident to advise proper authorities of the level of risk associated with this hazard and institute appropriate mitigation measures.

Conventionally, fratricide analysis is performed manually. Various exemplary embodiments describe development and utilization of an automated Fratricide Probability Calculator (FPC), which more precisely calculates fratricide probabilities for user defined ship classes and layouts, as well as various gun weapon systems (i.e., projectile launcher) and missile launching systems (e.g., potential interception hazard).

Conventional analytical efforts have incorporated cylindrical modeling to calculate the probability. Preferably, spherical modeling can provide more accurate results by taking into consideration the various fly-out paths as well as various slewing actions of the gun. The FPC can employ this spherical modeling along with other enhancements to provide an automated capability to provide quick and accurate probabilities of fratricide for a myriad of weapon systems combinations.

The calculation of fratricide probability can be analogized as a ratio of the total amount of area being presented by a target relative to the total area available in which the gun can fire. A blindfolded person randomly throwing darts at a dart board on a wall represents a hypothetical example. Assuming that the person can only strike within the boundaries of the wall, for a dart board that represents one-tenth the presented area of the wall, the chances that the person hits the board is ten-percent (10%). The calculation of fratricide probability introduces greater complexity than the simple random dart-throwing analogy assumes, particularly for combat vessels (e.g., naval ships) with intricate restrictions depending on positions of superstructure components, antenna masts, etc.

FIG. 1 shows a block diagram flowchart view 100 of cylindrical collision modeling to calculate fratricide probability. The modeling steps begin with gun firing zone determination 110, and proceeds to missile sector determination 120. The model continues to distance calculation 130 between the missile center and the gun and field-of-fire calculation 140. The model follows by determining height calculation 150 of the exposed missile, and proceeds with probability calculation 160 of fratricide for each missile cell. The model concludes by repeating these procedures for final determination 170 of maximum and average probabilities are determined for the entire system.

First Step 110: The model determines the gun firing zones for a warship or other combat vessel from the gun-mount view over a missile system that contains a plurality of missiles. The gun firing zone is defined as the region within which the gun can fire without striking any portion of the ship. Irrespective of type or class, each ship possesses a unique layout and therefore different firing zones from other ships. The gun firing zones are defined in terms of their azimuth and elevation boundaries. For the example described herein, the entire gun firing zone can be divided into separate sectors, depending on the minimum elevation angles.

Figure 2:
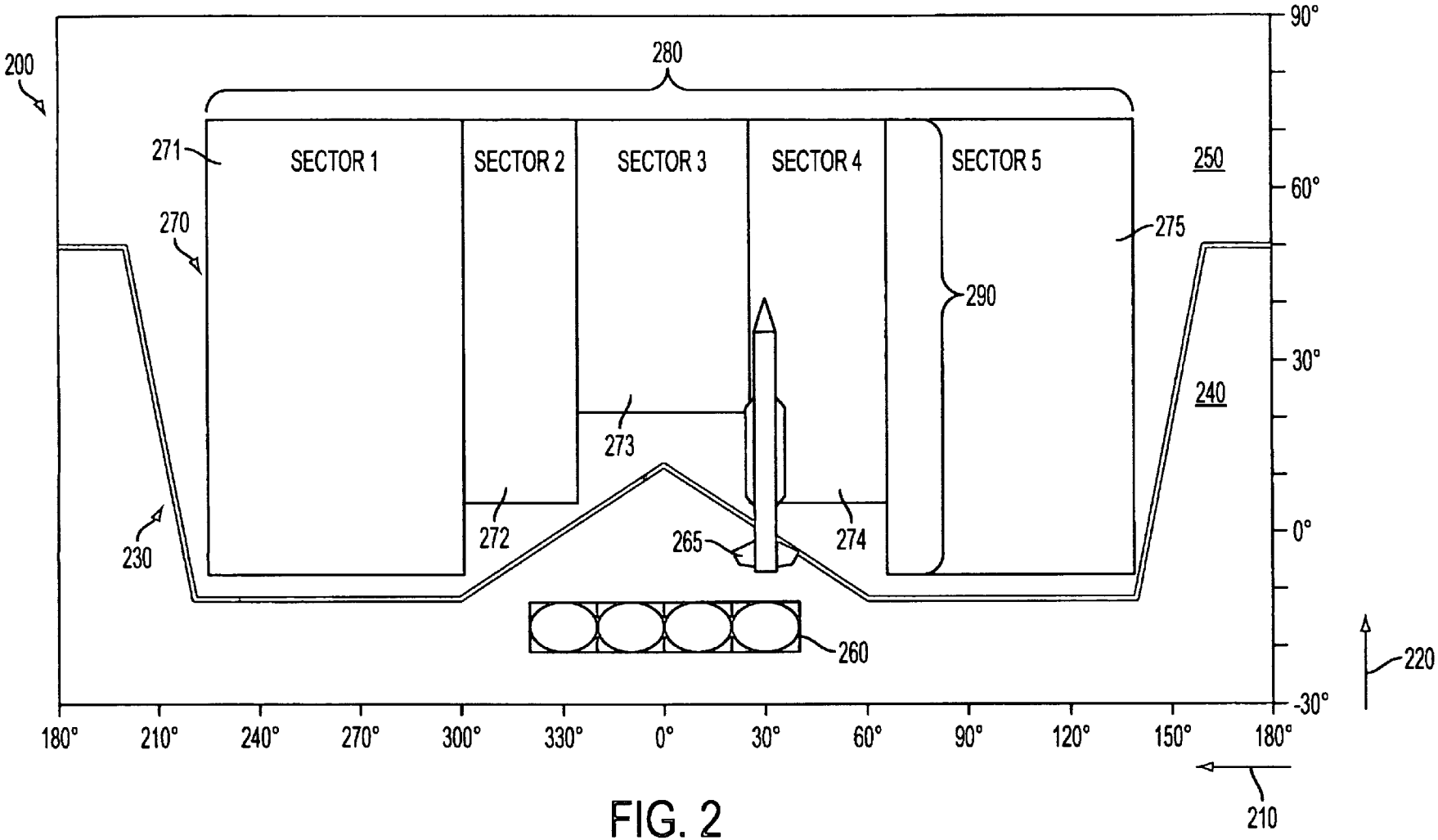
FIG. 2 is an elevation graphical view of Gun Perspective of Firing Firing Zones.
Figure 3:
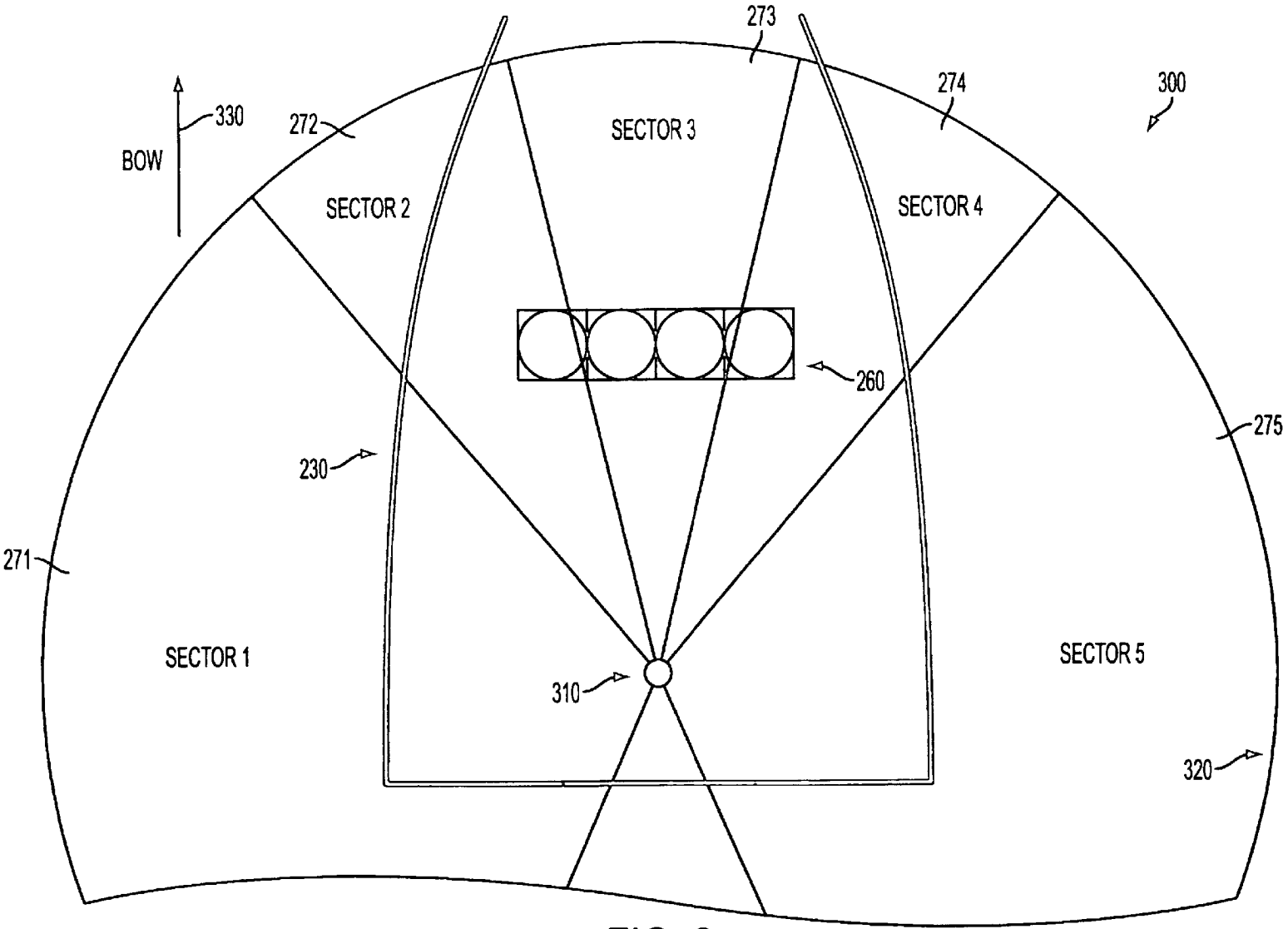
FIG. 3 is a plan view of Missile to Sector Determination.

Second Step 120: The model identifies which sector to which each missile corresponds. Aegis-equipped warships house vertically containerized missiles launched from cells. FIGS. 2 and 3, described subsequently, illustrate the missile positions as located within the second-through-fourth sectors of the five shown. If a missile cell overlaps two sectors, the cell can be selected as corresponding to the sector which contained half or more of the cell area for calculation purposes.

Third Step 130: The model calculates the distance R between the center of each missile cell and the gun. This determination can be performed using the Pythagorean Theorem using orthogonal rectangular coördinates.

Fourth Step 140: The model calculates the field-of-fire area $A_f$ above each missile cell using cylindrical geometry. Spherical geometry techniques are discussed subsequently.

For a cylindrical geometry as an example, eqn (1) can be used as a function of distance R. The parameters to be determined include the firing azimuth arc $\Delta\theta_f$ and the height $H_f$ of the field-of-fire above the missile cells. The azimuth arc $\Delta\theta_f$ in eqn (2) is based on azimuth boundary difference from port to starboard swing of the gun mount. The firing height $H_f$ in eqn (3) is based on the relative angular difference between elevation and depression bounds. These equations are provided below:

$$A_f = 2\pi R\left(\frac{\Delta\theta_f}{360^\circ}\right)H_f = 2\pi R^2\left(\frac{\Delta\theta_f}{360^\circ}\right)\tan(\Delta\phi_f) \tag{1}$$

$$\Delta\theta_f = \theta_2 - \theta_1 \tag{2}$$

$$H_f = R\tan(\Delta\phi_f),\ \exists\ \ \Delta\phi_f = \phi_2 - \phi_1, \tag{3}$$

where $\theta_1$ and $\theta_2$ are the respective port and starboard azimuth bounds (in degrees) and $\phi_1$ and $\phi_2$ are the respective elevation and depression bounds.

Fifth Step 150: The model calculates the exposed missile height $H_m$ in the field-of-fire over each missile cell. For vertical length values of the missile exceeding the firing height of eqn (3), the exposed missile height $H_m$ is assigned to equal the field-of-fire height $H_f$ over the missile cell. Otherwise, the exposed missile height $H_m$ equals the vertical length of the missile.

Sixth Step 160: The model calculates the probability of fratricide for each missile cell. The missile area $A_m$ can be calculated based on the exposed missile height $H_m$ and the width of the missile $W_m$ in eqn (4). The fratricide probability $P_f$ can then be calculated based on the missile area $A_m$ and the total field-of-fire area $A_f$ in eqn (5). The equations are shown below:

$$A_m = H_m W_m \tag{4}$$

$$P_f = \frac{A_m}{A_f}, \tag{5}$$

where the total field-of-fire $A_f$ is determined in eqn (1).

Seventh Step 170: The model extends these calculations to determine the maximum and average of all the missile probabilities for the entire missile system. This involves determining the overlapping regions between gun slew and missile firings over the entire combat vessel.

Firing zones for an exemplary combat vessel can be visualized along an elevation view (such towards the bow) and a plan view (from above) in FIGS. 2 and 3, respectively. FIG. 2 illustrates a gun-perspective panorama 200 with abscissa 210 and ordinate 220 demarcating angular degrees. The abscissa 210 represents azimuth from the longitudinal ship axis, with port extending positively from 0° and starboard extending negatively from 360°. The ordinate 220 represents elevation from −30° (depression) to +90° (vertical). A ship horizon outline 230 from the gun's perspective demarcates definitive regions. The region below the outline 230 denotes a restrictive "cutout" area 240, whereas the region above the outline 230 denotes a firing area 250.

Missile cells 260 are disposed within the restrictive area 240. An example missile profile 265 features a Standard-Missile-2 adjacent to the cells 260, which represent the Vertical Launcher System (VLS) that houses these missiles before launch. The example surface-to-air missile 265 in profile represents an interception hazard against which probability of collision may be calculated.

A firing zone 270 denotes portions of the angular window through which the gun may aim. This zone 270 may be subdivided into substantially rectangular sectors 271, 272, 273, 274 and 275 as plotted along the azimuth-quantifying abscissa 210 and the elevation-quantifying ordinate 220. The firing zone 270 (or its individual sectors) may be quantified by an azimuth 280 and by an elevation 290.

FIG. 3 illustrates a crows-nest vantage 300 with the ship outline 230 and missile cell positions 260. From this perspective, the sectors 271, 272, 273, 274 and 275 represent arcs across angles plotted along the abscissa 210. The gun's vantage is denoted by a central position 310, with the radial limits of the sectors denoted by an arc 320, and the direction of the ship's bow denoted by arrow 330.

Figure 4:
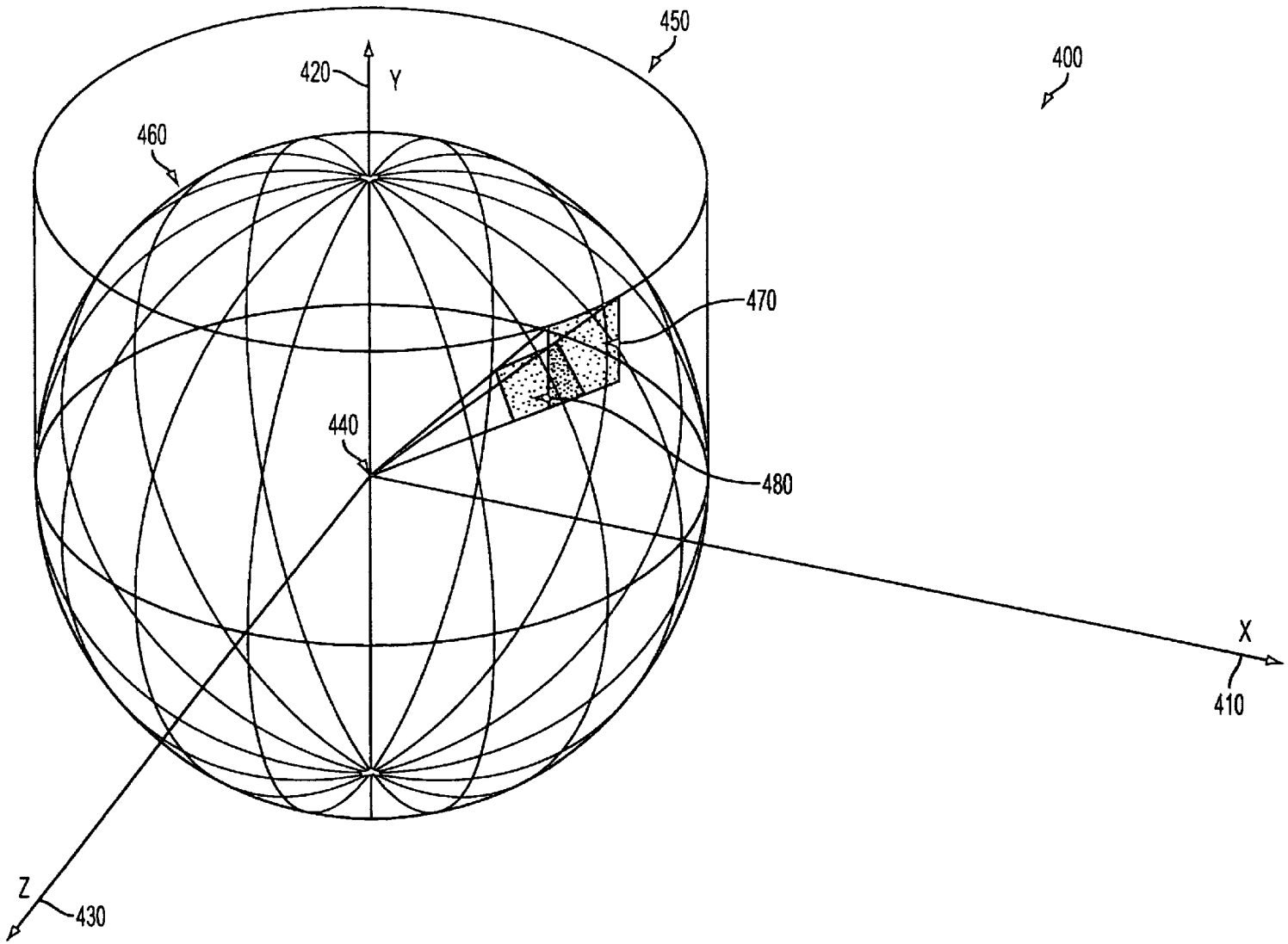
FIG. 4 is a perspective geometric view of Difference in Area Projected on a Sphere and Cylinder.

Cylindrical Modeling Limitations: Although cylindrical modeling can be appropriate for an exemplary analysis, this geometry introduces error as elevation increases. This effect can be observed in FIG. 4 from the perspective view 400 shown. Three-dimensional orthogonal axes are illustrated in the axial X direction 410, the vertical Y direction 420 and the lateral Z direction 430, with a center position 440 as the origin. A cylinder 450 and a sphere 460 extend about the center 440 as origin. Spherical and cylindrical projections radiate from the origin, visibly displaying respectively a cylindrical four-cornered region 470 and a spherical four-cornered region 480. As the elevation (or latitude) increases (i.e., diverges from 0°), the cylindrical region 470 distorts further in relation to the spherical region 480.

Figure 5:
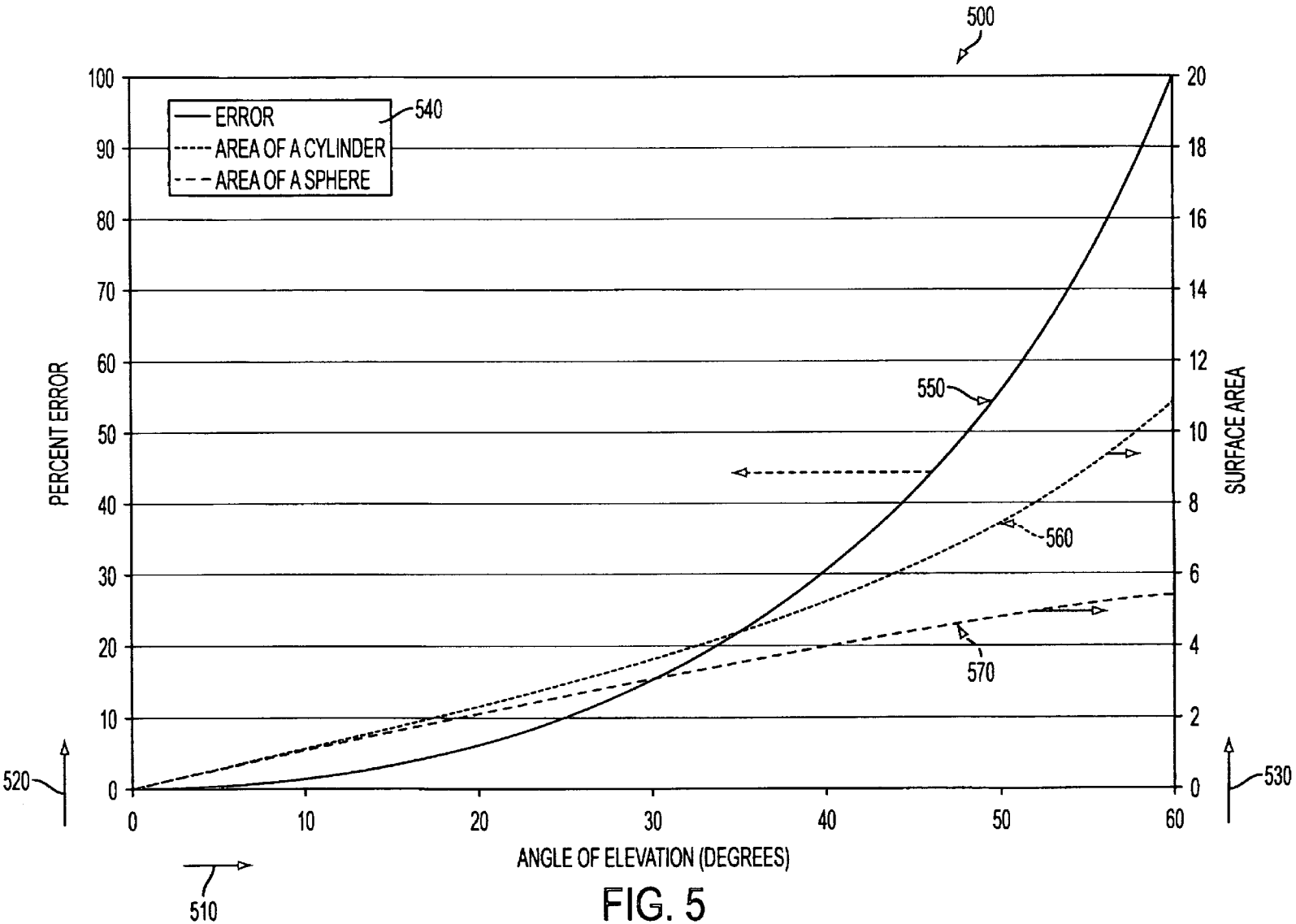
FIG. 5 is a graphical view of Percent Error in Cylindrical Modeling.

FIG. 5 illustrates a plot 500 of projection error in relation to elevation angle. The abscissa 510 represents angle of elevation (in degrees). The left ordinate 520 represents percent error, and the right ordinate 530 represents surface area error (in non-defined exemplary units). A legend 540 identifies the plotted lines. Line 550, as measured against the left ordinate 520, exhibits exponential increase in error with increasing elevation. The area lines 560, 570 are comparable against the right ordinate 530. The cylindrical area value 560 increases exponentially, whereas the spherical area value 570 appears monotonic.

As observable in the FIG. 5 graph, the distortion error in area reaches one-hundred-percent (100%) at an elevation of 60°. In contrast the same image projected on a sphere is not distorted. In conventional analysis, gun elevation is assumed to be limited, thereby consigning the distortion errors to be negligible. However, future analyses are expected to involve greater ranges in azimuth, necessitating reduction or elimination of this error source, which can be accomplished with spherical modeling. Such an adjustment corrects distortion in the firing height $H_f$ that increases asymptotically.

Spherical Modeling Method: The FPC provides a tool that can quickly and accurately calculate the probability of fratricide between a gun and another weapon system. This tool enables automation of the process to be executable on a standard desktop computer, thereby enabling analysis of any combination of ship type, layout, gun, and ship launched ordnance system while considering the three dimensional relationship between the gun and other ordnance.

Analysis efforts focus on ship-launched missiles, due to the criticality and detrimental effects of the fratricide mishap. However, ordnance also includes ship self-defense weapons and gun projectiles. In special cases, a gun barrel may also be modeled as the ordnance to be examined. Consideration can be given to the vulnerability of the ordnance as well as the total elapsed time in which the missile is within the field-of-view of the gun.

For the purpose of alterations and reproducibility, the operator is assumed to be able to create and save a database of ordnance, gun, ship types, and layouts, as well as missile motion parameters and gun firing scenarios. Additional fidelity in the predictions can be gained through the use of Monte Carlo scenarios in which combinations of variables could be modified with respect to one another.

Parameter Inputs: The main inputs are the gun firing zones, gun firing parameters, physical dimensions of the ordnance, and ordnance flyout parameters, including trajectory. The gun firing zones are defined in terms of their azimuth and elevation boundaries as depicted in FIG. 2, and can be easily stored and retrieved in tabular form, such as a spreadsheet file.

The gun firing parameters are defined by the path along which the gun is trained and the duration of time the gun fires a round. For simplicity, the path can be defined as a straight line between starting and ending coördinates (azimuth and elevation). The duration can be defined as either a period of time or a single shot. For simplicity in these examples, the passage of the ordnance between two rounds can be neglected.

A "collision" occurs if the gun points at the ordnance at any time while firing. The physical dimensions of the ordnance may be loaded into the program via a Computer Aided Drafting (CAD) file, while the ordnance's flyout parameters can be modeled as a series of orthogonal coördinates related to the position of the ordnance over a series of time-steps. Additional accuracy can be added by incorporating gun-firing probability zones and ordnance vulnerability maps into the calculation.

Description of Mathematical Method: One significant difference between cylindrical and spherical modeling involves the absence of a physical surface to yield an area of the gun firing zone against which to compare to the target's area facing the gun. The target as described herein represents a fratricide hazard, although these principles can be extended to intended interception scenarios.

Therefore, a sounder approach compares the angular area of the target to that of the firing zone presented to the gun. Angular areas, called solid angles $\Omega$, are measured in steradians, in the same manner that standard angles can be measured in radians. The solid angle of a sphere equals $4\pi$ steradians. The calculation of angular areas includes two different geometries: rectangular and triangular solid angles.

Figure 6:
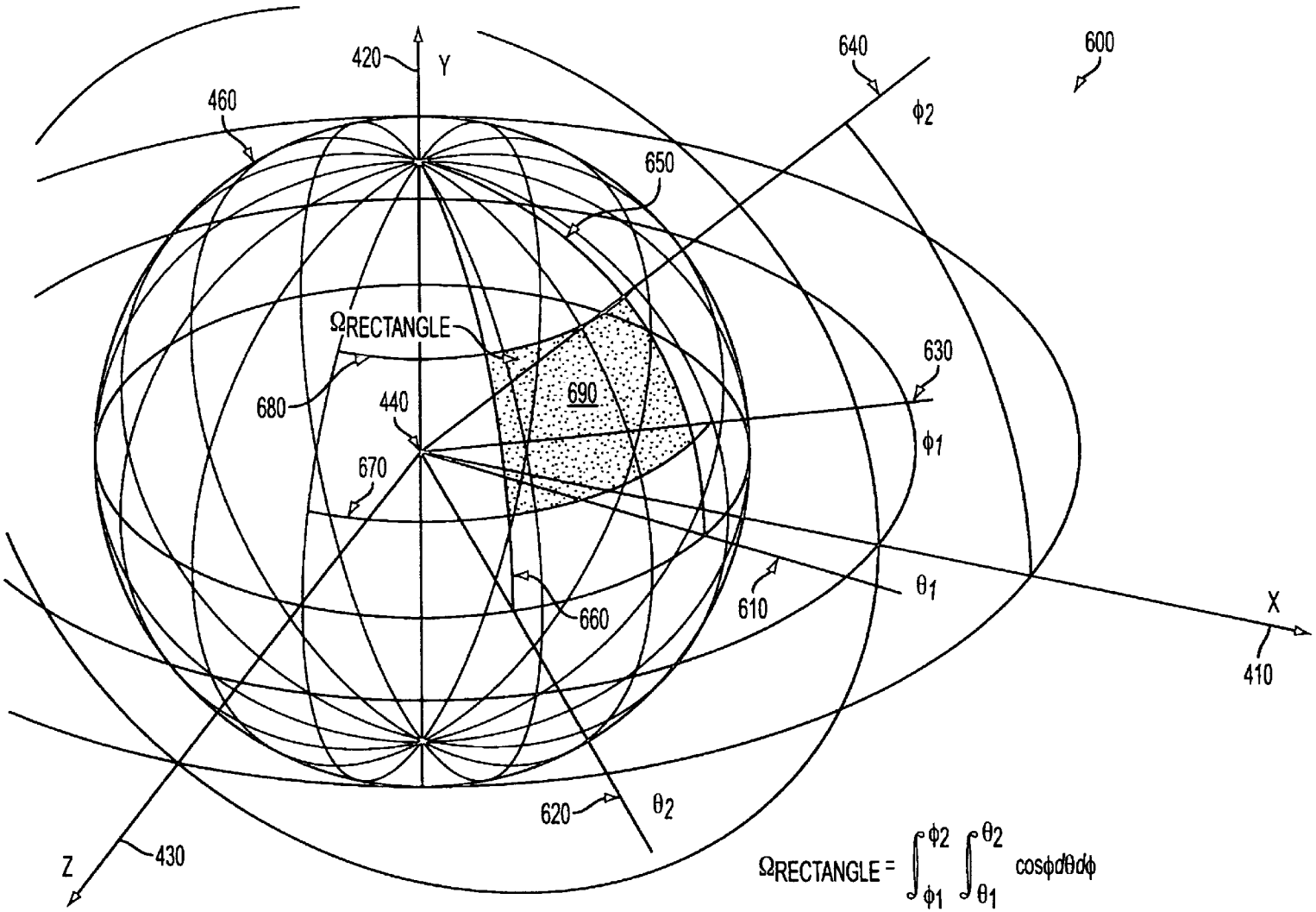
FIG. 6 is a perspective geometric view Representing a Rectangular Solid Angle.

FIG. 6 shows a perspective view 600 of a four-corner angular area projected onto a spherical surface. The three-dimensional coördinates for the X, Y and Z axes correspond to labels in FIG. 4, as do the origin 440 and the sphere 460. In the X-Z horizontal plane, a first azimuth line 610 extends from the origin 440 forming a port-side azimuth angle $\theta_1$ as the first port azimuth form the X axis 410. Another second azimuth line 620 extends from the origin 440 forming a starboard-side azimuth angle $\theta_2$ as the second starboard azimuth from the X axis 410. In the X-Y vertical plane, a first elevation line 630 extends from the origin 440 forming a depression angle $\phi_1$ as the first elevation from the X axis 410. Another second elevation line 640 extends from the origin 440 forming an elevation angle $\phi_2$ as the second elevation from the X axis 410.

The first pair of azimuth lines 610, 620 provides lesser and greater longitudinal boundaries 650, 660. The second pair of elevation lines 630, 640 produces lower and higher latitude boundaries 670, 680. These curved boundaries 650, 660, 670 and 680 produce a rectangular solid area 690 or shadow denoted as $\Omega_{rectangle}$ that maps onto the sphere 460. The rectangular solid angle 690 can be calculated from the azimuth and elevation boundaries corresponding to the integral solution of eqn (6):

$$\Omega_{rectangle} = \int_{\phi_1}^{\phi_2} \int_{\theta_1}^{\theta_2} \cos\phi d\theta d\phi, \tag{6}$$

where $\theta_1$ and $\theta_2$ are the azimuth bounds 650, 660 and $\phi_1$ and $\phi_2$ are the elevation bounds 670, 680. These boundaries can be used to constitute an area representing a solid angle $\Omega_{firingzone}$ for the firing zone.

Figure 7:
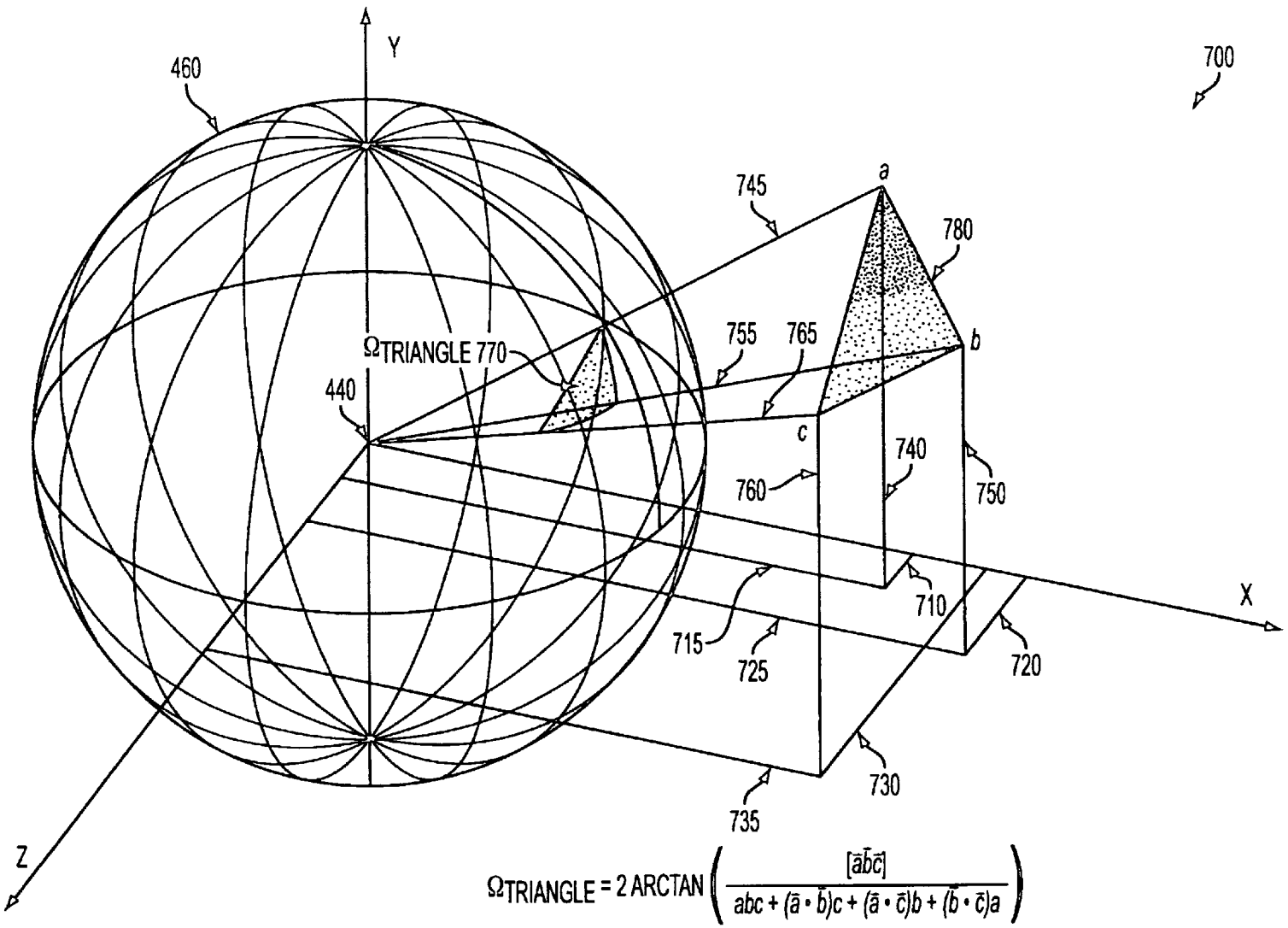
FIG. 7 is a perspective geometric view Representing a Triangular Solid Angle.

FIG. 7 shows a perspective view 700 of three-corner angular areas projected onto spherical and Cartesian surfaces. The three-dimensional coördinates for the X, Y and Z axes correspond to labels in FIG. 4, as do the origin 440 and the sphere 460. In the X-Z plane, a first horizontal line 710 extends from the X-axis 410 in the Z direction, and a second horizontal line 715 extends from the Z-axis 430 in the X direction. Similarly, third and fourth horizontal lines 720, 725 respectively extend in the Z and X directions, with fifth and sixth horizontal lines 730, 735 also extending in like manner.

In the X-Y plane, a first vertical line 740 extends from the intersection of horizontal lines 710, 715 in the Y direction reaching to point a. Correspondingly, a first radial line 745 extends from the origin 440 to point a. Similarly, second vertical and radial lines 750, 755 respectively extend in the Y and radial directions to point b, with third vertical and radial lines 760, 765 also extending in like manner to point c.

The radial lines 745, 755, 765 extending from the origin 440 intersect through the surface of the sphere 460 to bound a triangular solid angle 770 or shadow labeled $\Omega_{triangle}$. These radial lines extend to points a, b and c to form a flat Cartesian triangle 780 beyond the sphere 460. Calculating the triangular solid angles involves the magnitudes of the three points of the triangle 780 in three-dimensional orthogonal space (e.g., Cartesian, polar, etc.). This can be expressed as eqn (7):

$$\Omega_{triangle} = 2\arctan\left(\frac{[\vec{a}\vec{b}\vec{c}]}{abc + (\vec{a}\cdot\vec{b})c + (\vec{a}\cdot\vec{c})b + (\vec{b}\cdot\vec{c})a}\right), \tag{7}$$

where a, b, c represent the scalar magnitudes (corresponding to the radial lengths of the lines 745, 755 and 765), and the tensors $\vec{a}$, $\vec{b}$, $\vec{c}$ represent the directional vectors from the origin 440 to their respective points.

Because the gun firing zone 270 in FIG. 2 is defined as a series of azimuth and elevation bounds 280, 290, the total angular area of the zone 270 equals the sum of rectangular solid angles dictated by these bounds (represented by the sections 271 through 275). The ordnance's dimensions and location can be mathematically defined as a series of points in space similar to points a, b, c in FIG. 7, which are easier to determine than azimuth and elevation bounds.

Consequently, the techniques described herein prefer the triangular method to solve for the solid angle of the ordnance. This can be accomplished by dividing the ordnance into a series of triangles in space (known as "meshing" in finite element modeling) and then adding the solid angles of each individual triangle for a combined profile, such as by $\Omega_{ordnance}=\Sigma\Omega_{triangle}$ by summation.

Figure 8:
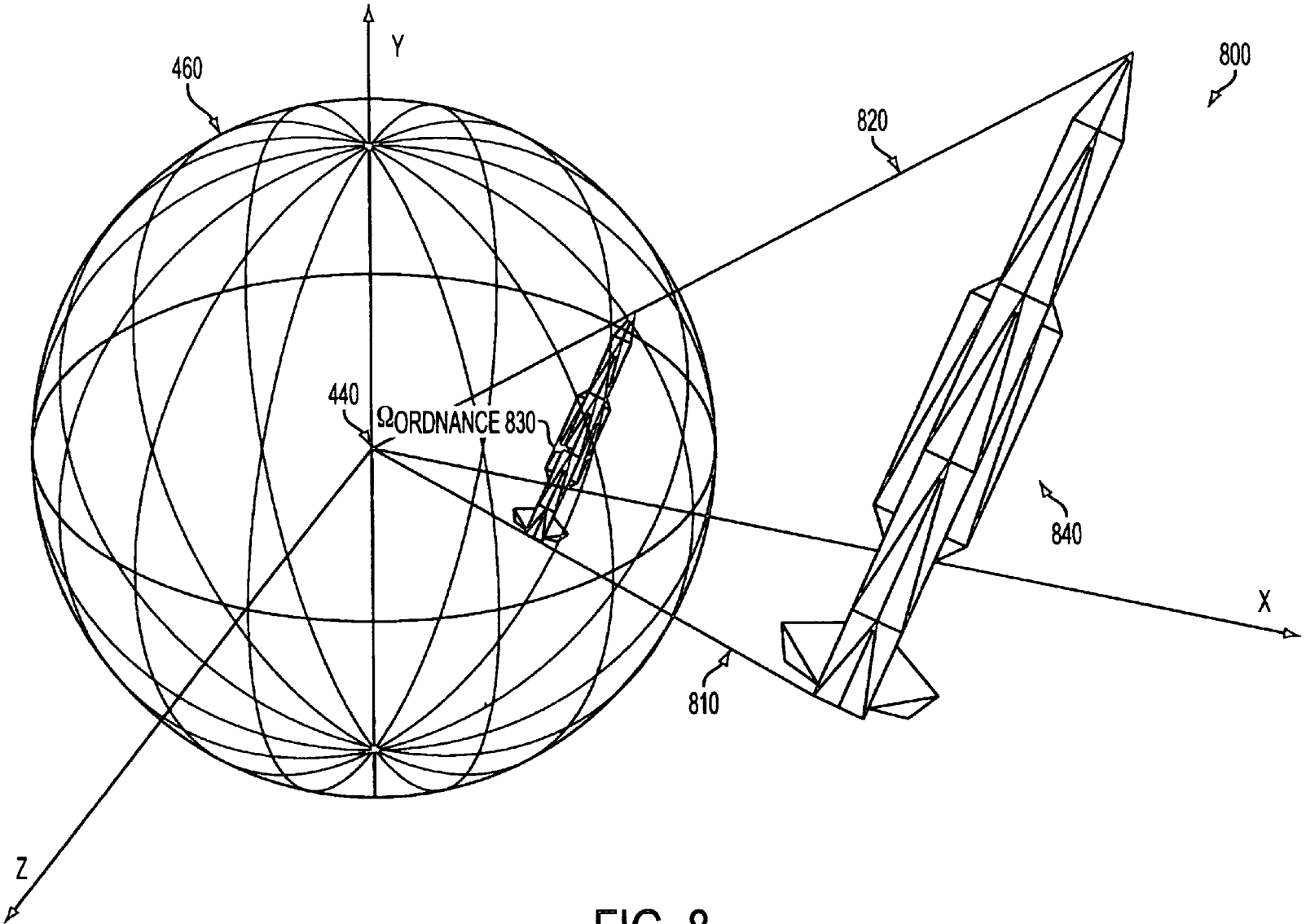
FIG. 8 is a perspective geometric view for Decomposition of Ordnance into Triangles.

FIG. 8 shows a perspective view 800 of a missile in three-dimensional space divided into triangular surfaces. The three-dimensional coördinates for the X, Y and Z axes correspond to labels in FIG. 4, as do the origin 440 and the sphere 460. The combined set of triangles representing the missile provides lower and upper boundary lines 810, 820 demarcating the missile's axial length. The missile solid area 830 or shadow projects a region labeled $\Omega_{ordnance}$ on the sphere 460 corresponding to the missile frontal area 840 in space beyond.

As mentioned previously, the resultant fratricide probability $P_f$ equals the ratio of solid angles between the ordnance and firing zone, as expressed in eqn (8):

$$p_f = \frac{\Omega_{ordnance}}{\Omega_{firingzone}}, \tag{8}$$

where $\Omega_{ordnance}$ represents the solid area 830 of the missile and $\Omega_{firingzone}$ represents the solid area 840 of the gun firing zone 270.

For a single shot from the gun, the fratricide probability can be readily determined. However, determining a fratricide probability solution becomes more complicated for either when a gun is slewing or is firing over an extended time interval, because the relative motion between the gun and the ordnance must be accounted for. (Either example may represent a high-speed missile intercept and/or avoidance scenario.) In the case of ordnance motion, a solid angle shadow extending over the entire firing duration can be modeled.

A collision (interception of the ordnance) occurs in consequence to a gun firing continuously at any single point in its firing zone, with the ordnance traveling through the gun-firing line. Continuous firing in this context means that intervals yield distances between bullets (or other gun-launched projectile) is smaller than the missile's smallest dimension.

Figure 9:
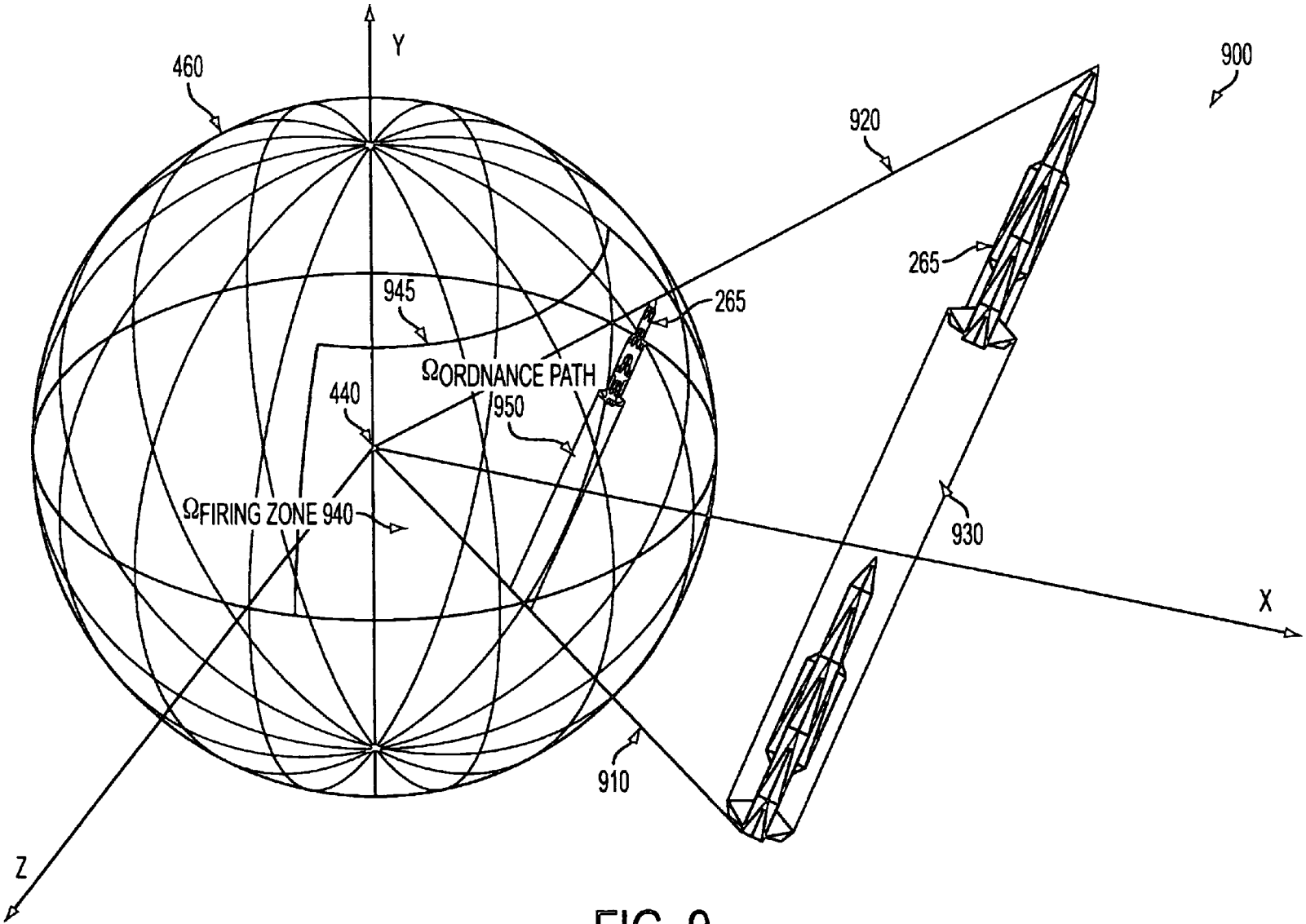
FIG. 9 is a perspective geometric view of Shadow Creation from Ordnance of a Solid Angle.

FIG. 9 shows a perspective view 900 of a missile passing through three-dimensional space. The three-dimensional coördinates for the X, Y and Z axes correspond to labels in FIG. 4, as do the origin 440 and the sphere 460. Representation of the missile 265 is shown by projection on the sphere 460 and in space. Lower and upper boundary lines 910, 920 define the missile path 930 along a time interval that corresponds to the gun-accessible portion of the trajectory. The gun firing zone 270 can be projected on the sphere 460 as a solid area 940 representing a region labeled $\Omega_{firingzone}$ and outlined by a firing boundary 945.

Intersection of the sphere 460 by the boundary lines 910, 920 projects a smaller solid area 950 representing a region labeled $\Omega_{ordnancepath}$. The fratricide probability $P_f$ of eqn (8) can be revised accordingly by substituting the trajectory solid angle $\Omega_{ordnancepath}$ for the original ordnance solid angle $\Omega_{ordnance}$ in the numerator.

For a slewing gun, the ordnance is likewise in relative motion to the gun's aim point 310, corresponding to the spatial origin 440. This motion creates a distortion of the ordnance's shadow as solid angle 830 on the sphere 460. While the gun motion creates a greater solid angle for the ordnance, the solid angle 940 of the firing zone labeled $\Omega_{firingzone}$ remains unchanged. The solid angle of the firing zone projection 940 is based on the ship outline 230, whereas the solid angle of the ordnance 830 and/or its path 950 is measured relative to the gun aim vantage 310.

Figure 10:
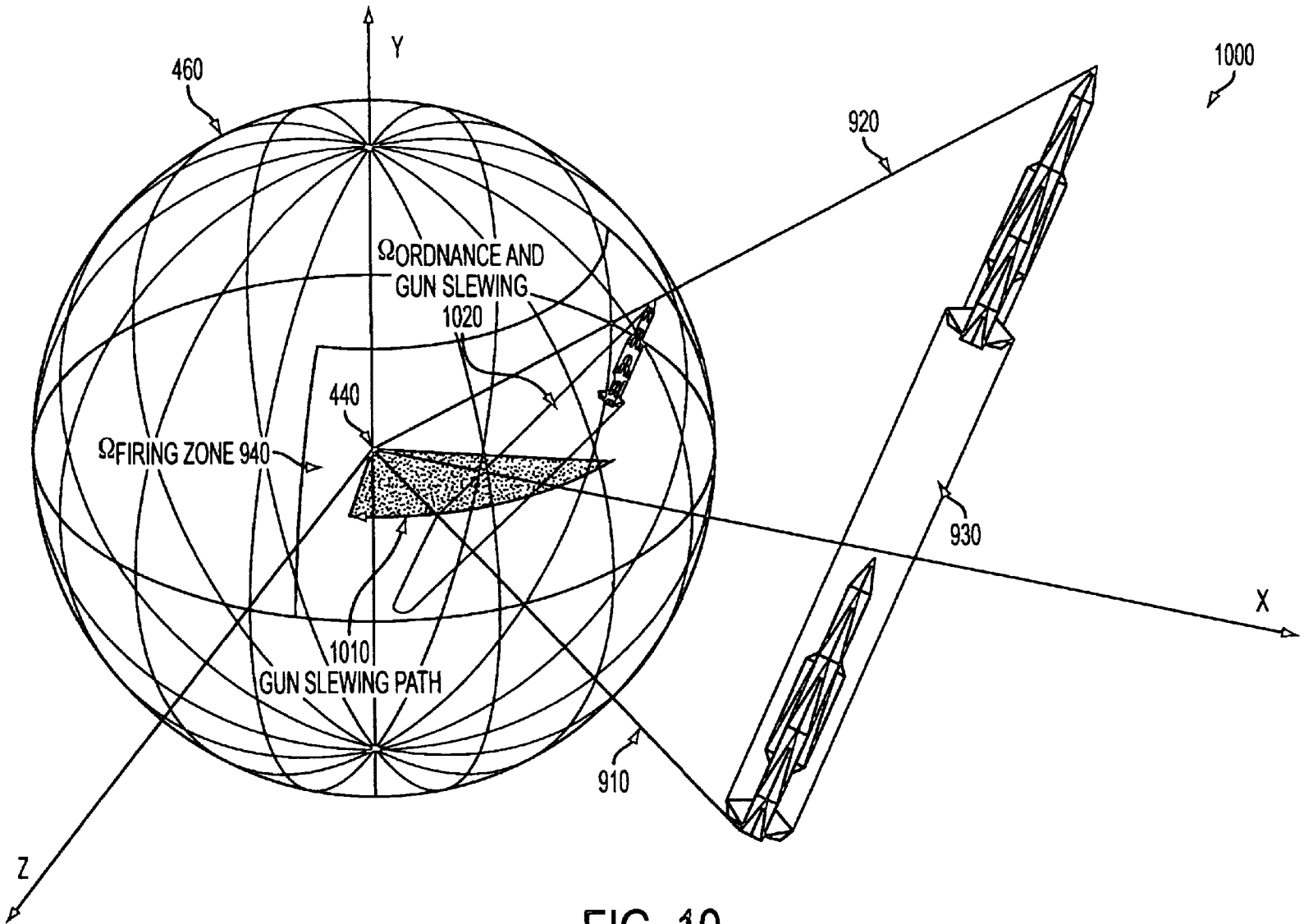
FIG. 10 is a perspective geometric view of Motion of Gun Slew Creates Additional Distortion.

FIG. 10 shows a perspective view 1000 of a missile passing through three-dimensional space as the gun slews. Pivoted at the origin 440, the gun swings along an arc path 1010 that projects within the firing zone solid area 940. Integration of the slewing arc 1010 and missile path bounded by lines 910, 920 yields a combination ordnance-travel and gun-slewing solid angle 1020 labeled as $\Omega_{ordnance\text{-}and\text{-}slew}$, thereby increasing fratricide probability with proportional increase of the numerator term.

Figure 11:
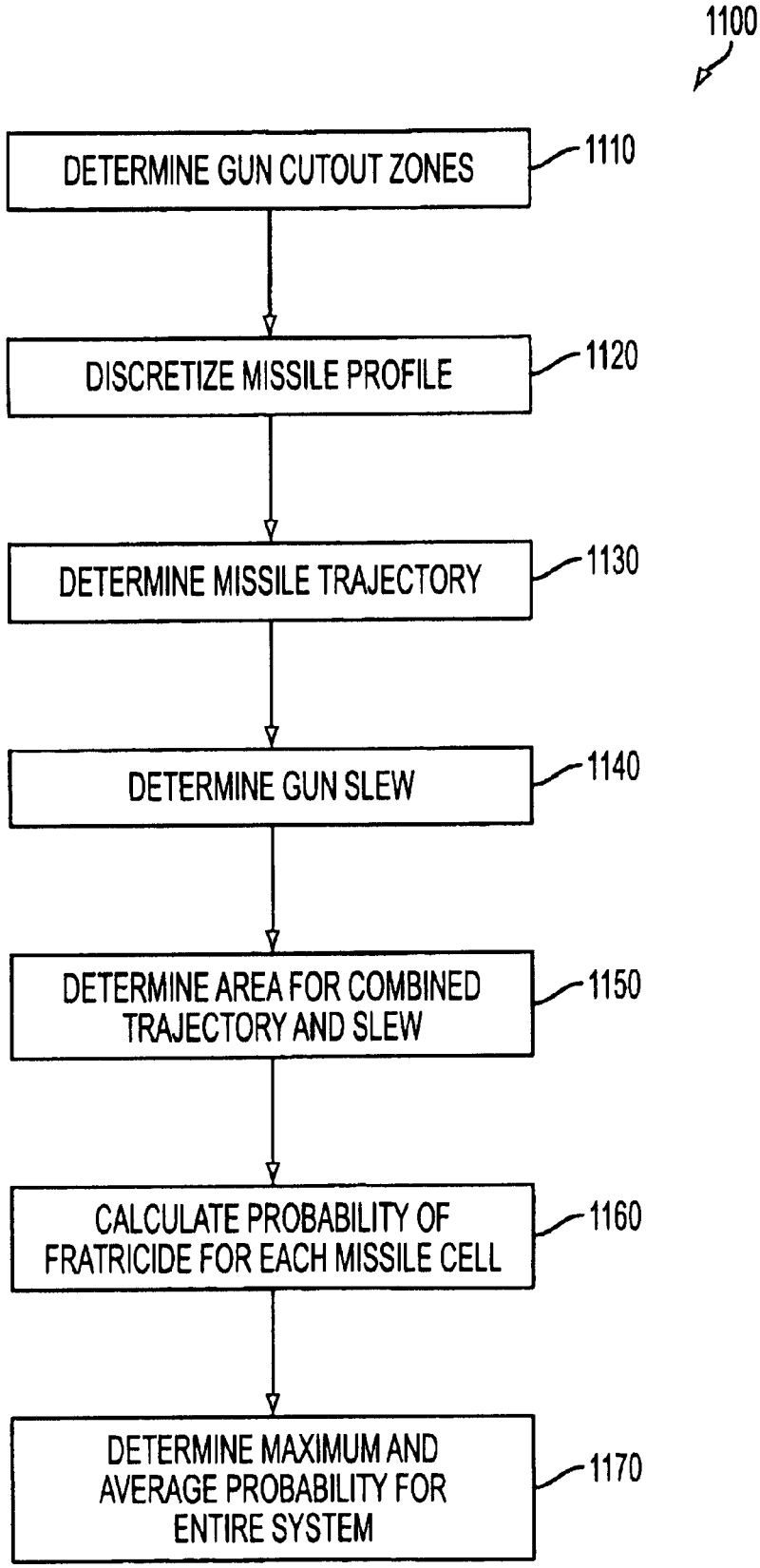
FIG. 11 is a flowchart of a method for Determining Fratricide Probability using spherical geometry.

FIG. 11 shows a block diagram flowchart view 1100 of spherical collision modeling to calculate fratricide probability as a summary to these techniques described. The modeling steps begin with gun firing zone determination 1110, and proceeds to discretization of the missile's profile 1120. The model continues to determine the missile's trajectory path 1130 from its launch cell, and the angular sweep of the gun's slew 1140.

The model follows by determining the solid angle of the combined path and sweep 1150, and proceeds with probability calculation 1160 of fratricide for each launch cell. The model concludes by repeating these procedures for final determination 1170 of maximum and average probabilities are determined for the entire system.

First Step 1110: The model determines the gun firing zones for a ship from the gun-mount view over the missile system. The gun firing zones are defined in terms of their azimuth and elevation boundaries, thereby enabling their boundaries as shown in FIG. 6 to be calculated. The azimuth and the cosine of the elevation are double-integrated between their limits using the rectangular area formula in eqn (6) to determine their respective solid angles as $\Omega_{firingzone}$.

Second Step 1120: The model discretizes the elevation-view frontal profile of the missile 265, such as into triangular plates 840 as determined by eqn (7). The boundaries of these plates can be represented as shown in FIG. 7 by discrete points (that represent the missile) projected from the gun's position 310.

Third Step 1130: The model calculates the missile's trajectory path 930 from its launch cell. This can be accomplished by translating the discrete points representing the missile across its trajectory flight path to produce a solid angle $\Omega_{ordnancepath}$ for the ordnance path 950 mapped onto the sphere 460.

Fourth Step 1140: The model calculates the angular sweep of the gun's slew. This can be accomplished by mapping the gun-slewing sweep 1010 swept from the center 440 onto the sphere 460.

Fifth Step 1150: The model determines the solid angle of the combined path and sweep. The mapped area 1020 in FIG. 10 illustrates an exemplary solid angle $\Omega_{ordnance\text{-}and\text{-}slew}$ formed by the combined missile path and gun slew. This can be accomplished by translating the discrete points representing the ordnance path from the third step 1130 across the sweep of the slewing gun in the fourth step 1140 to determine the boundary limit points within the firing zone area 940 that define the region in which the gun can fire into the missile's trajectory.

Sixth Step 1160: The model calculates the probability of fratricide for each of the missile cells 260 using eqn (8) with $\Omega_{ordnance}$ representing the path-and-slew solid angle 1020 of the fifth step 1150 and $\Omega_{firingzone}$ representing the solid area 940 of the gun firing zone 270 of the second step 1120. Alternatively for circumstances neglecting gun slew, eqn (8) can employ $\Omega_{ordnance}$ as representing only the ordnance path solid angle 950 of the third step 1130.

Seventh Step 1170: The model extends these calculations to determine the maximum and average of all the missile probabilities for the entire missile system. This involves determining the overlapping regions between gun slew and missile firings over the entire combat vessel.

Additional precision of the fratricide probability may be achieved by including gun fire probability zones into the calculation. These are simply areas of the gun firing zone 270 in which the probability of firing may vary. Such an example would be a gun that fires seven-five-percent (75%) of the time between −5° and +10° elevation and the remainder above this region within the firing zone 270.

Figure 12:
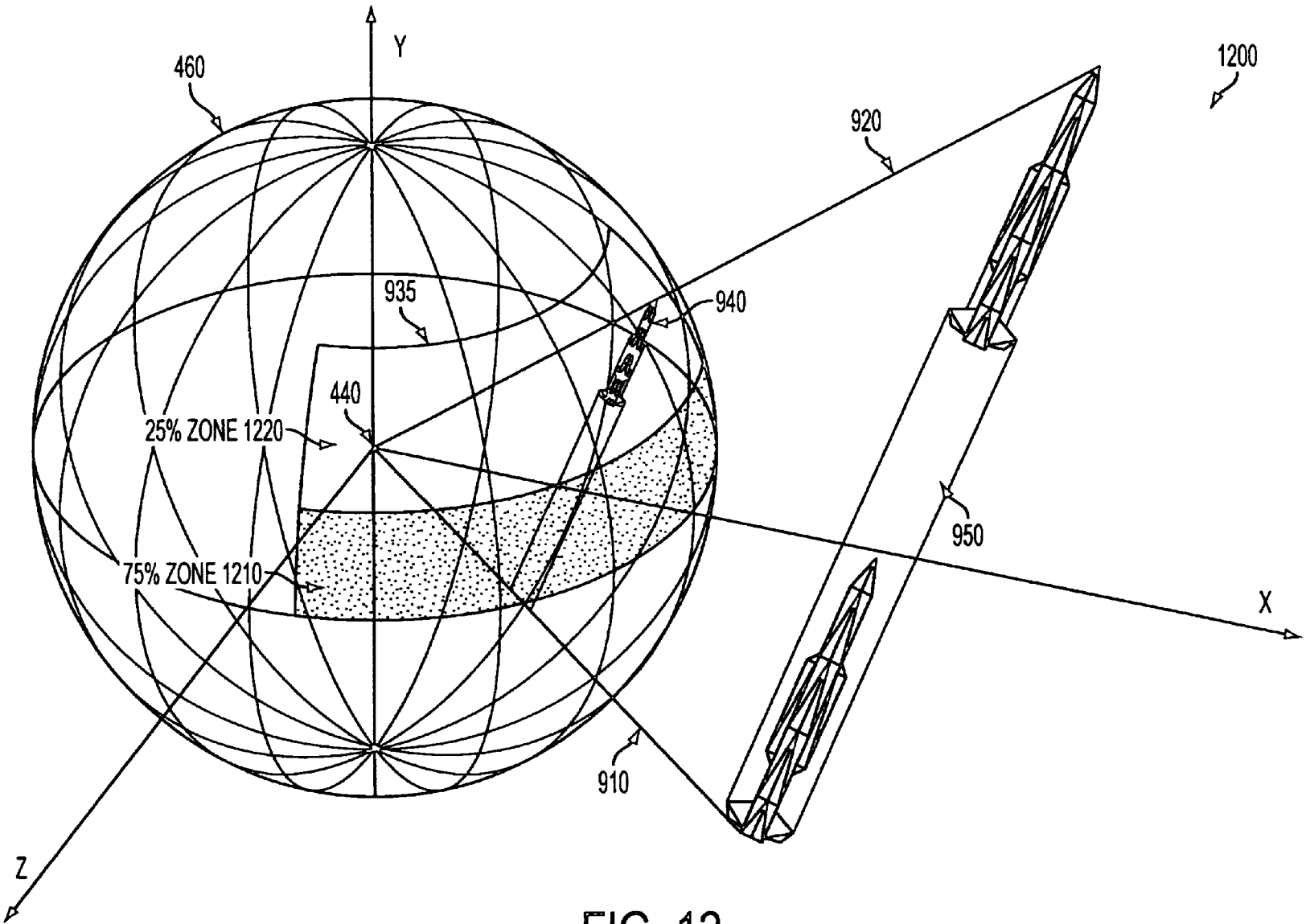
FIG. 12 is a perspective geometric view Adding Gun Fire Probability Zones.

This capability incorporates into the fratricide probability calculation weighting factors to the solid angle depending on the corresponding probability zone. FIG. 12 shows a perspective view 1200 of a missile passing through three-dimensional space. The projected firing zone solid area 940 is shown subdivided into a lower zone portion 1210 and an upper zone portion 1220. Within each lower and upper portion, the gun respectively fires 75% and 25% of the total operational time.

Figure 13:
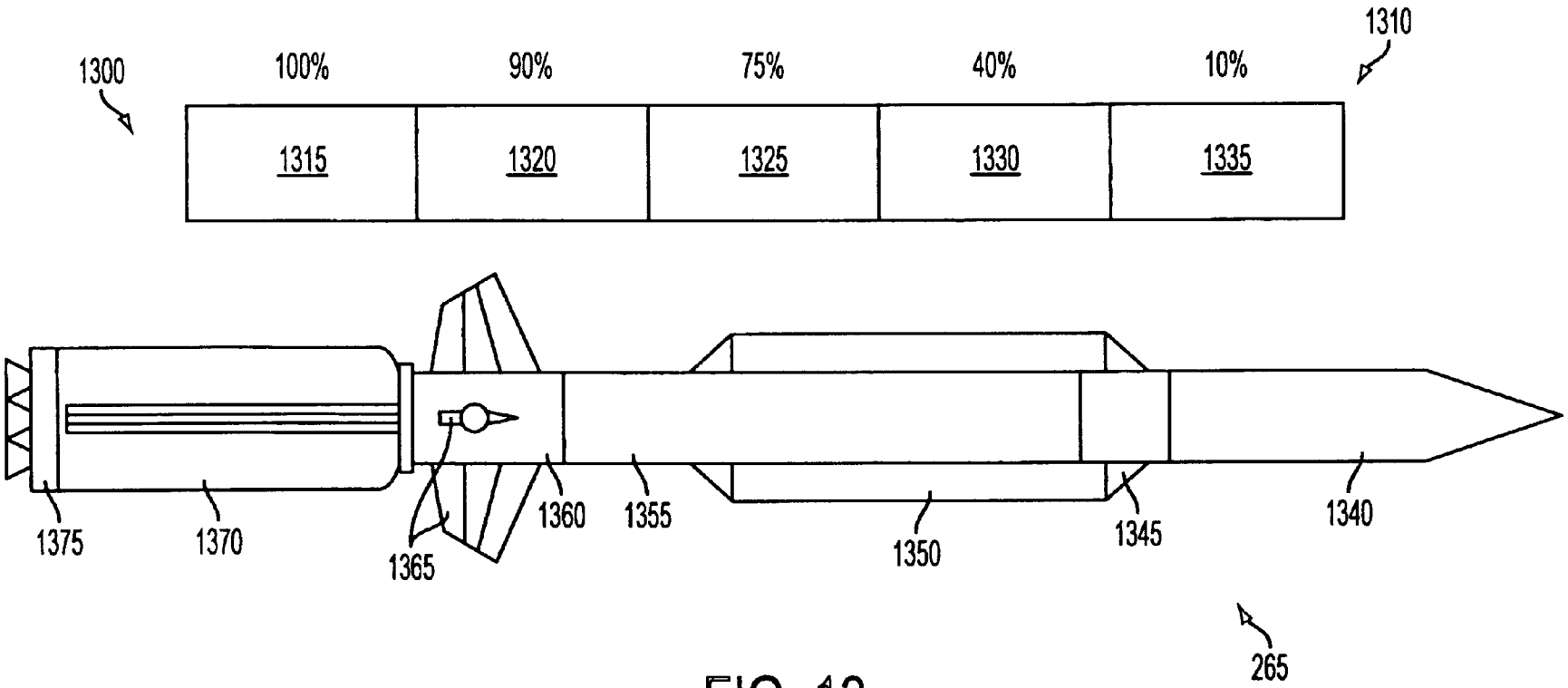
FIG. 13 is an elevation view of a hypothetical Ordnance Vulnerability Map.

These techniques may also be applied to ordnance vulnerability in the same manner as for determining gun-fire probability zones increase precision. A round penetrating the warhead significantly increases the chance for fratricide whereas hitting a fin or another inert component may not. FIG. 13 shows an ordnance model 1300 that can be included to feature an ordnance vulnerability map. Similar to the gun fire probability, ordnance vulnerability (calculated by the ordnance designers) can be included in the fratricide probability calculation by adding and subtracting weighting factors to the solid angle.

FIG. 13 includes a legend 1310 with hypothetical graduated gray-scale levels corresponding to vulnerability. These exemplary vulnerabilities are characterized as a first level 1315 for 100%, a second level 1320 for 90%, a third level 1325 for 75%, a fourth level 1330 for 40% and a fifth level 1335 for 10%. A missile profile representation 265 includes regions having gray-scale shading that corresponds to the associated vulnerability level. These regions include the nose 1340, an integration connector 1345, radial flanks 1350, mid-section 1355, aft fin guidance 1360 with pivotable cruciform fins 1365, propellant section 1370 and aft propulsion nozzle 1375. Artisans of ordinary skill will recognize that this model is exemplary only.

Further accuracy can be added by running Monte Carlo scenarios. The technique enables comparative analysis of multiple firing times, slewing paths, and ordnance flyout courses against one another. The resultant fratricide probabilities can then be averaged together to achieve a more confident result.

Development of the Fratricide Probability Calculator adds significant capability in determining the fratricide probability between two shipboard weapon systems. Inclusion of spherical modeling of the ship environment leads to a better representation of the relationship between the gun and the ordnance. The technique facilitates a mathematical determination of the effects of a complicated ordnance fly-out path and slewing gun on the fratricide probability. Thus, these techniques generate higher fidelity probabilities and expand the variables that can be analyzed.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for determining fratricide probability of projectile collision from a projectile launcher on a platform and an interception hazard ejectable from a deployment position, the method comprising:

determining a firing zone of the platform, said firing zone presenting an area through which the projectile launcher operates;

calculating an angular firing zone area from said firing zone that extends from the projectile launcher;

quantifying a frontal area of the interception hazard to produce an intercept area with respect to the projectile launcher;

translating said frontal area across a flight trajectory of said intercept area to produce a path area; and determining the fratricide probability for said deployment position from dividing said path area by said angular firing zone area.

2. The method according to claim 1, wherein the platform is a combat vessel, the projectile launcher is a gun, the interception hazard is a missile, and the deployment position is a vertical launch cell.

3. The method according to claim 1, wherein calculating said angular firing zone further includes calculating an integral for a rectangular solid angle as:

$$\Omega_{rectangle} = \int_{\phi_1}^{\phi_2}\int_{\theta_1}^{\theta_2}\cos\phi d\theta d\phi,$$

where $\theta_1$ and $\theta_2$ are azimuth bounds and $\phi_1$ and $\phi_2$ are elevation bounds of said firing zone.

4. The method according to claim 1, wherein quantifying said frontal area further includes:

discretizing a perspective view of the interception hazard into discrete spatial points, each point having a coördinate position in relation to the projectile launcher;

evaluating said points as a contiguous group of triangular plates, each plate being represented by triangular points of said spatial points, said each triangular plate forming a triangular solid angle $\Omega_{triangle}$ determined by:

$$\Omega_{triangle} = 2\arctan\left(\frac{[\vec{a}\vec{b}\vec{c}]}{abc + (\vec{a}\cdot\vec{b})c + (\vec{a}\cdot\vec{c})b + (\vec{b}\cdot\vec{c})a}\right),$$

where scalar magnitudes a, b, c represent distances and tensors $\vec{a}$, $\vec{b}$, $\vec{c}$ represent vectors between respective said triangular points and the projectile launcher; and summing said each triangular solid angle to produce said frontal area as an intercept solid angle $\Omega_{ordnance}$.

5. The method according to claim 1, wherein determining the fratricidal probability further includes dividing an intercept solid angle determined from discretizing said path area by a firing solid angle determined from azimuth bounds and elevation bounds of said firing zone as:

$$p_f = \frac{\Omega_{ordnance}}{\Omega_{firingzone}},$$

where $P_f$ represents fratricidal probability, $\Omega_{ordnance}$ represents said intercept solid angle, and $\Omega_{firingzone}$ represents said firing solid angle.

6. A method for determining fratricide probability of projectile collision from a projectile launcher on a platform and an interception hazard ejectable from a deployment position, the method comprising:

determining a firing zone of the platform, said firing zone presenting an area through which the projectile launcher operates;

calculating an angular firing zone area from said firing zone that extends from the projectile launcher;

quantifying a frontal area of the interception hazard to produce an intercept area with respect to the projectile launcher;

translating said frontal area across a flight trajectory of said intercept area to produce a path area;

angularly sweeping the projectile launcher to produce a slew angle;

superimposing said slew angle over said path area to produce a combination area; and determining the fratricide probability for said deployment position from dividing said combination area by said angular firing zone area.

7. The method according to claim 6, wherein the platform is a combat vessel, the projectile launcher is a gun, the interception hazard is a missile, and the deployment position is a vertical launch cell.

8. The method according to claim 6, wherein calculating said angular firing zone further includes calculating an integral for a rectangular solid angle as:

$$\Omega_{rectangle} = \int_{\phi_1}^{\phi_2}\int_{\theta_1}^{\theta_2}\cos\phi d\theta d\phi,$$

where $\theta_1$ and $\theta_2$ are azimuth bounds and $\phi_1$ and $\phi_2$ are elevation bounds of said firing zone.

9. The method according to claim 6, wherein quantifying said frontal area further includes:

discretizing a perspective view of the interception hazard into discrete spatial points, each point having a coördinate position in relation to the projectile launcher;

evaluating said points as a contiguous group of triangular plates, each plate being represented by triangular points of said spatial points, said each triangular plate forming a triangular solid angle $\Omega_{triangle}$ determined by:

$$\Omega_{triangle} = 2\arctan\left(\frac{[\vec{a}\vec{b}\vec{c}]}{abc + (\vec{a}\cdot\vec{b})c + (\vec{a}\cdot\vec{c})b + (\vec{b}\cdot\vec{c})a}\right),$$

where scalar magnitudes a, b, c represent distances and tensors $\vec{a}$, $\vec{b}$, $\vec{c}$ represent vectors between respective said triangular points and the projectile launcher; and summing said each triangular solid angle to produce said frontal area as an intercept area $\Omega_{ordnance}$.

10. The method according to claim 6, wherein determining the fratricidal probability further includes dividing an intercept solid angle determined from discretizing said combination area by a firing solid angle determined from azimuth bounds and elevation bounds of said firing zone as:

$$p_f = \frac{\Omega_{ordnance}}{\Omega_{firingzone}},$$

where $P_f$ represents fratricidal probability, $\Omega_{ordnance}$ represents said intercept solid angle, and $\Omega_{firingzone}$ represents said firing solid angle.

11. A system for determining fratricide probability of projectile collision from a projectile launcher on a platform and an interception hazard ejectable from a deployment position, said system comprising:

a firing determiner for determining a firing zone of the platform, said firing zone presenting an area through which the projectile launcher operates;

a calculator for calculating an angular firing zone area from said firing zone as extending from the projectile launcher;

a quantifier for quantifying a frontal area of the interception hazard to produce an intercept area;

a translator for translating said frontal area across a flight trajectory of said intercept area to produce a path area;

a sweeper for angularly sweeping the projectile launcher to produce a slew angle;

a superpositioner for superimposing said slew angle over said path area to produce a combination area; and a probability determiner for determining the fratricide probability for said deployment position from dividing said combination area by said angular firing zone area.

12. The system according to claim 11, wherein the platform is a combat vessel, the projectile launcher is a gun, the interception hazard is a missile, and the deployment position is a vertical launch cell.

13. The system according to claim 11, wherein said calculator operates to further calculate an integral for a rectangular solid angle as:

$$\Omega_{rectangle} = \int_{\phi_1}^{\phi_2}\int_{\theta_1}^{\theta_2} \cos\phi d\theta d\phi,$$

where $\theta_1$ and $\theta_2$ are azimuth bounds and $\phi_1$ and $\phi_2$ are elevation bounds of said firing zone.

14. The system according to claim 11, wherein said quantifier operates to further:

discretize a perspective view of the interception hazard into discrete spatial points, each point having a coördinate position in relation to the projectile launcher;

evaluate said points as a contiguous group of triangular plates, each plate being represented by triangular points of said spatial points, said each triangular plate forming a triangular solid angle determined by:

$$\Omega_{triangle} = 2\arctan\left(\frac{[\vec{a}\vec{b}\vec{c}]}{abc + (\vec{a}\cdot\vec{b})c + (\vec{a}\cdot\vec{c})b + (\vec{b}\cdot\vec{c})a}\right),$$

where scalar magnitudes a, b, c represent distances and tensors $\vec{a}$, $\vec{b}$, $\vec{c}$ represent vectors between respective said triangular points and the projectile launcher; and sum said each triangular solid angle to produce said frontal area.

15. The system according to claim 11, wherein said probability determiner operates to further divide an intercept solid angle determined from discretization of said combination area by a firing solid angle determined from azimuth bounds and elevation bounds of said firing zone as:

$$p_f = \frac{\Omega_{ordnance}}{\Omega_{firingzone}},$$

where $P_f$ represents fratricidal probability, $\Omega_{ordnance}$ represents said intercept solid angle, and $\Omega_{firingzone}$ represents said solid angle.

* * * * *